United States Patent [19]

Sakoe et al.

[11] Patent Number: 4,513,435
[45] Date of Patent: Apr. 23, 1985

[54] SYSTEM OPERABLE AS AN AUTOMATON FOR RECOGNIZING CONTINUOUSLY SPOKEN WORDS WITH REFERENCE TO DEMI-WORD PAIR REFERENCE PATTERNS

[75] Inventors: Hiroaki Sakoe; Seibi Chiba, both of Tokyo, Japan

[73] Assignee: Nippon Electric Co., Ltd., Tokyo, Japan

[21] Appl. No.: 370,637

[22] Filed: Apr. 21, 1982

[30] Foreign Application Priority Data

Apr. 27, 1981 [JP] Japan ................. 56-63666

[51] Int. Cl.³ .............................. G10L 1/00
[52] U.S. Cl. .................................... 381/41
[58] Field of Search ........................ 381/41–45; 382/33, 34, 37

[56] References Cited

U.S. PATENT DOCUMENTS

4,049,913 9/1977 Sakoe ................. 381/43
4,059,725 11/1977 Sakoe ................. 381/43
4,156,868 5/1979 Levinson ............. 381/43

Primary Examiner—E. S. Matt Kemeny
Attorney, Agent, or Firm—Sughrue, Rothwell, Mion, Zinn, Macpeak & Seas

[57] ABSTRACT

A system for recognizing a continuously spoken word sequence with reference to preselected reference words with the problem of coarticulation removed, comprises a pattern memory for memorizing demi-word pair reference patterns consisting of a former and a latter reference pattern segment for each reference word and a word pair reference pattern segment for each permutation with repetition of two words selected from the preselected reference words. A recognition unit is operable as a finite-state automaton on concatenating the demi-word pair reference patterns so that no contradiction occurs at each interface of the reference patterns in every concatenation. It is possible to use the automaton in restricting the number of reference patterns in each concatenation either to an odd or an even positive integer.

7 Claims, 9 Drawing Figures

SYSTEM OPERABLE AS AN AUTOMATON FOR RECOGNIZING CONTINUOUSLY SPOKEN WORDS WITH REFERENCE TO DEMI-WORD PAIR REFERENCE PATTERNS

BACKGROUND OF THE INVENTION

This invention relates to a continuous speech or voice recognition system.

A speech recognition system has a number of advantages as a device for supplying commands and data to a machine system or a computer system as inputs thereof. A considerable number of speech recognition systems are already in practical use. Above all, a continuous speech recognition system is excellent in that such a system is capable of continuously supplying numerals and other data to machines and computer systems and has an accordingly high input speed.

Continuous speech recognition has been approached in a variety of ways. It appears that a system according to the two-level DP-matching, as it is called in the art, has most excellent performance. A system of this type is described, for example, in U.S. Pat. No. 4,049,913 issued to Hiroaki Sakoe, one of the present applicants, and assigned to Nippon Electric Co., Ltd., the instant assignee, and in an article contributed by Hiroaki Sakoe to IEEE Transactions on Acoustics, Speech, and Signal Processing, Vol. ASSP-27, pp. 588–595 (No. 6, December 1979), under the title of "Two-Level DP-Matching—A Dynamic Programming-Based Pattern Matching Algorithm for Connected Word Recognition. The algorithm is for effectively carrying out those principles, according to which an input voice or speech pattern representative of a succession or sequence of continuously spoken words is matched to an optimum one of a plurality of reference pattern concatenations given by various concatenations of reference word patterns of preliminarily individually or discretely pronounced reference words. The excellent performance results from the fact that it is unnecessary according to the algorithm to preparatorily divide or segment the input voice pattern into input word patterns which are in one-to-one correspondence to the continuously spoken words.

As pointed out in the above-referenced Sakoe article, the second complete paragraph on page 589, the two-level DP-matching technique has still been objectionable in that no countermeasure is taken for the coarticulation effect, according to which the physical characteristics of a phoneme are influenced by a preceding phoneme and/or a succeeding one. Depending on the circumstances, the coarticulation effect degrades the matching between a reference word pattern and an input word pattern. To speak of Japanese numerals, let a continuously spoken word succession be a two-digit or two-word numeral /gojon/ (corresponding to /five-four:/ in English) and the succession be supplied to a continuous speech recognition system in which two individual reference word patterns for the respective one-digit numerals /go/ (five) and /jon/ (four) are preliminarily stored or registered. In the neighborhood of a point of merge of the two continuously spoken words /go/ and /jon/, a strong coarticulation effect may take place to appreciably vary the physical characteristics of the preceding phoneme /o/ and the subsequent phoneme /j/ from those in the individual reference word patterns. The two-level DP-matching technique has nothing to do therewith. The coarticulation effect therefore gives rise to misrecognition as the case may be.

It is already known on the other hand that a finite-state automaton is effective in reducing misrecognition of a continuous speech recognition system. A system operable as such an automaton is revealed in U.S. patent application Ser. No. 175,798 (now U.S. Pat. No. 4,326,101) filed Aug. 6, 1980, by Hiroaki Sakoe, one of the instant applicants and assigned to the present assignee.

According to the system disclosed in U.S. Pat. No. 4,326,101, an input voice pattern representative of a succession of words continuously spoken in compliance with a regular grammar or the grammar of a regular language, is recognized with reference to a plurality of reference word patterns which are representative of individually pronounced reference words, respectively, and stored in the system preliminarily of supply thereto of the input voice pattern. The recognition is controlled by the finite-state automaton so that the input voice pattern is recognized as a concatenation of the reference word patterns which is not contradictory to the regular grammar.

SUMMARY OF THE INVENTION

It is therefore an object of the present invention to provide a continuous speech recognition system, which recognizes an input voice pattern with high accuracy.

It is another object of this invention to provide a continous speech recognition system of the type described, which correctly recognizes an input voice pattern even in the presence of a coarticulation effect.

It is still another object of this invention to provide a continuous speech recognition system of the type described, which is free from the problem of coarticulation and is operable as a finite-state automaton.

According to this invention, there is provided a continuous speech recognition system for recognizing a succession of continuously spoken words with reference to a plurality of preselected reference words each of which has an intra-word characteristic point, comprising means for memorizing a plurality of discrete demi-word pair reference patterns and means connected to the reference pattern memorizing means to be operable as a finite-state automaton to recognize the succession by using a pattern concatenation of optimum demi-word pair reference patterns which are selected from the discrete demi-word pair reference patterns and concatenated at least at an interface. For the system according to this invention, each discrete demi-word pair reference pattern is given by a sequence of parameters characteristic of a demi-word pair lies between the intra-word characteristic point of a preceding reference word and the intra-word characteristic point of a succeeding reference word, wherein the preceding and the succeeding reference words are continuously pronounced. Furthermore, the automaton is for controlling the concatenation so that no contradiction occurs at every interface.

BRIEF DESCRIPTION OF THE DRAWING

FIGS. 3 (A), (B), and (C) are schemetic representations of a set of speech patterns for use in describing operation of the segmenting unit during a first cycle;

FIGS. 4 (A) and (B) schematically show a speech pattern and a pattern concatenation, respectively, for use in describing operation of the segmenting unit during a second cycle;

DESCRIPTION OF THE PREFERRED EMBODIMENTS

Figure 1:
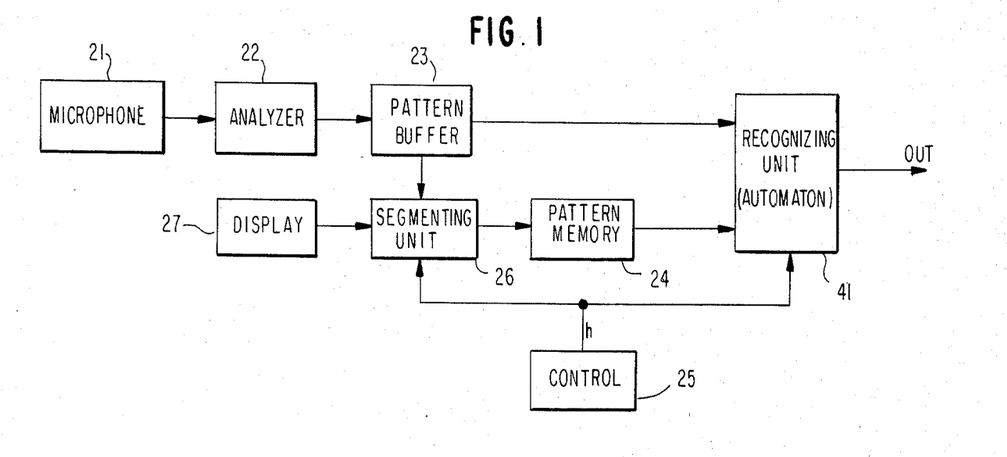
FIG. 1 is a block diagram of a continuous speech recognition system according to a preferred embodiment of the instant invention.

Referring to FIG. 1, a continuous speech recognition system according to a preferred embodiment of the present invention, is supplied with a voice signal from a microphone 21. The voice signal represents an input speech pattern A and has a certain input pattern duration or length I. The input speech pattern A is what is herein called an input voice pattern when the voice signal is for a continuously spoken word succession to be recognized by the system being illustrated. The input pattern duration I is dependent on the duration of an individual word pronounced or spoken to the microphone 21. For an input voice pattern, the duration I depends also on the number of continuously spoken words.

An analyzing unit 22 is for subjecting the voice signal to analysis and frame sampling to produce an input feature vector signal representative of a time sequence of first through I-th input pattern feature vectors $a_1$ to $a_I$. Such vectors will be written in the following by the corresponding ordinary letters merely for simplicity of denotation.

The input speech or voice pattern is now represented as:

$$A = a_1, a_2, \ldots, a_i, \ldots, a_I, \quad (1)$$

where $a_i$ represents an i-th input pattern feature vector. The input feature vector signal is delivered to a pattern buffer 23, which holds a predetermined number of the input pattern feature vectors at one time. Together with the pattern buffer 23, the analyzing unit 22 is described in detail in U.S. Pat. No. 3,816,722 issued to Hiroaki Sakoe and Seibi Chiba, the present applicants and assignors to the instant assignee, with reference to FIG. 11 thereof. As will become clear as the description proceeds, the predetermined number may be the number of input pattern feature vectors for two continuously pronounced reference words.

The illustrated recognition system is operable in two modes of operation. One is a registration mode of segmenting a reference pattern segment from a known input speech pattern A' representative of either one or two continuously pronounced ones of a plurality of preselected reference words and of storing or registering the reference pattern segment in a reference pattern memory 24 as a reference pattern. The other is a recognition mode of recognizing, with reference to such reference patterns, an unknown input voice pattern A'' representative of a continuously spoken word succession. A control unit 25 produces a mode switching signal h to switch the two modes from either one to the other. For instance, the system is operable in the registration and the recognition modes when the mode switching signal h has logic zero and one levels, respectively. The control unit 25 produces timing signals and control signals as described, for example, in the above-referenced Sakoe U.S. Pat. No. 4,326,101.

In the registration mode, a segmenting unit 26 is put into operation. The segmenting unit 26 may comprise a microprocessor, which may be that described in a Data Book published 1980 by Advanced Micro Devices, Inc., California, U.S.A., for AmZ8000 Family, at page 4-1.

Figure 2:
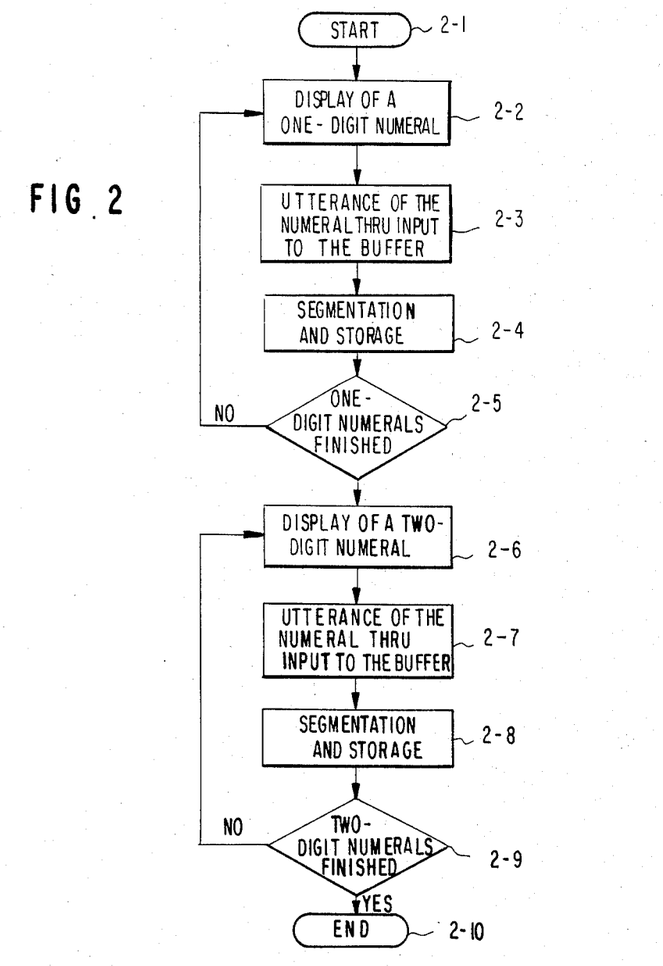
FIG. 2 shows a flow chart for use in describing operation of a segmenting unit of the system depicted in FIG. 1.

Turning to FIG. 2, let it be assumed merely for simplicity of description that the words to be recognized are Japanese numerals. Controlled by the control unit 25 and programmed as will presently become clear, the segmenting unit 26 segments or separates a reference pattern segment from the known input speech pattern A' supplied thereto from the pattern buffer 23 and stores the reference pattern segment in the reference pattern memory 24 as a reference pattern. The reference pattern is represented by a sequence of those parameters, such as some of the input pattern feature vectors described in conjunction with Equation (1), which are characteristic or representative of the reference pattern segment.

During a first cycle depicted in the top half of FIG. 2, one-digit numerals "0" through "9," which are now used as preselected reference words, respectively, are successively subjected to the registration mode of operation on a word-by-word basis. Start of the registration mode is indicated at 2-1. It is preferred that the segmenting unit 26 is programmed to make a displaying unit 27 display one of the one-digit numerals at first as shown at 2-2. As indicated at 2-3, the displayed numeral is pronounced or uttered to the microphone 21 and held in the pattern buffer 23 as a known input speech pattern A' of the type given by Equation (1). By way of example, the displayed numeral is "3." The pronunciating in Japanese is /san/.

Figure 3:
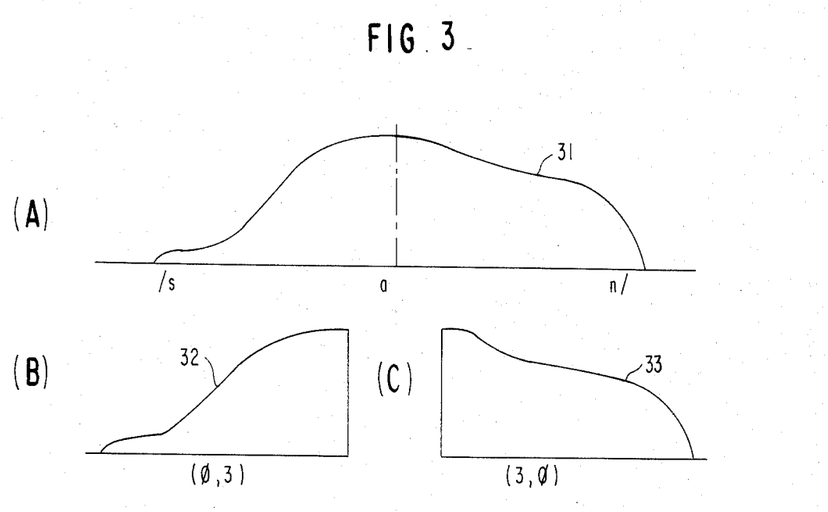

Referring to FIGS. 3 (A), (B), and (C) in addition to FIGS. 1 and 2, the known input speech pattern A' for the pronounciation is schematically depicted at 31. In compliance with the program, the segmenting unit 26 segments former and latter reference pattern segments 32 and 33 from the known input speech pattern 31 at an intra-word characteristic point, which is illustrated by a vertical dash-dot line and will later be discussed in detail. More particularly, the former and the latter reference pattern segments 32 and 33 are partitioned from each other at the intra-word characteristic point. The former and the latter reference pattern segments 32 and 33 are stored in the reference pattern memory 24 as two reference patterns ($\phi$, 3) and (3, $\phi$), respectively. Segmentation of the known input speech pattern 31 and storage of the two reference patterns are collectively indicated at 2-4 in FIG. 2. In such reference patterns, the symbol $\phi$ represents null or a latter or a former segment of a null reference pattern. In other words, the representations ($\phi$, 3) and (3, $\phi$) are indicative of the fact that no numeral is concatenated before and after the numeral "3," respectively.

As shown in FIG. 2 at 2-5, the segmenting unit 26 makes the display unit 27 display a new one of the one-digit numerals. Segmentation and storage are repeated for the new numeral. Repeating the operation, the segmenting unit 26 stores the reference patterns ($\phi$, 0) and (0, $\phi$) through ($\phi$, 9) and (9, $\phi$) for the respective one-digit numerals in the reference pattern memory 24.

It is possible to define the intra-word characteristic point in a number of ways. According to a simple definition, the intra-word characteristic point is an instant or point that bisects the input pattern duration I of each known input speech pattern, such as 31. When reference is had to the above-cited Sakoe U.S. Pat. No. 4,049,913, the instant is readily automatically found from the number I of the first through the I-th input pattern feature vectors $a_1$ to $a_I$ held in the pattern buffer 23. If the number I is odd, one of the input pattern feature vectors that bisects the input pattern duration I, may be included in a preselected one of the former and the latter reference pattern segments, such as 32 and 33.

Alternatively, the intra-word characteristic point may be an instant at which the spectra of utterance of a reference word have either a maximum or a minimum variation at or near the bisecting point. It is also possible to define the intra-word characteristic point by a voiceless consonant included in the utterance of a reference word, such as the word "instant," adjacently of the bisecting point. Particularly when a long voiceless explosive is incleded, as in the utterance of the Japanese word "Nippon" (pronounced /nip:on/, wherein /ni/ is pronounced like [ i]), it is possible to define the intra-word characteristic point by the pause in the long voiceless explosive. Various circuits are already known for use in finding out the alternatively defined intra-word characteristic points.

After completion of the first cycle, the segmenting unit 26 is put into operation in a second cycle illustrated in the bottom half FIG. 2. Two-digit numerals "00" through "99," which are given by permutations of pairs of the preselected reference words, are now subjected to the registration mode of operation with each two-digit numeral pronounced as a succession of two continuously spoken one-digit numerals. As in the first cycle, the segmenting unit 26 preferably makes the displaying unit 27 display one of the two-digit numerals as shown at 2-6. Let the displayed numeral be "74," which is pronounced in Japanese /nanajon/ corresponding to the pronunciation /sevenfour:/ in English. The pattern buffer 23 holds a continuous known input speech pattern A' for the two-digit numeral "74" in the form of Equation (1). The input pattern duration I is given by the whole duration of utterance of the numeral "74." The pronouncing through the holding steps are collectively indicated in FIG. 2 at 2-7.

Figure 4:
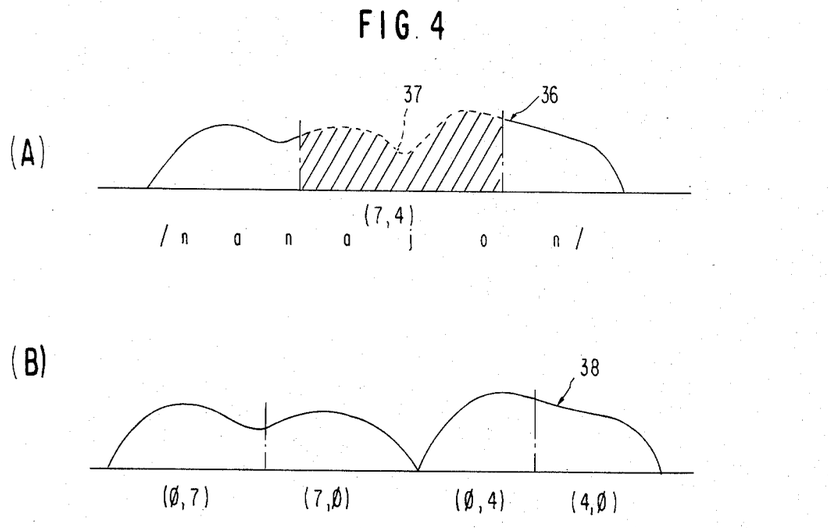

Referring now to FIGS. 4 (A) and (B) in addition to FIGS. 1 and 2, the continuous known input speech pattern for the numeral "74" is depicted at 36. In compliance with the program for carrying out an algorithm which will shortly become clear, the segmenting unit 26 segments that word pair reference pattern segment 37 from the continuous known input speech pattern 36 at a pair of intra-word characteristic points which is depicted as an area hatched under a dashed-line curve in the pattern 36. The word pair reference pattern segment 37 is stored in the reference pattern memory 24 as a reference pattern (7, 4). The processes are indicated in FIG. 2 at 2-8. For convenience of the description that follows, the two-digit numeral will be understood as a pair of those first and second selected ones of the preselected reference words which are successively continuously pronounced.

According to the algorithm for the segmentation process, the segmenting unit 26 concatenates the former and the latter reference pattern segments of the first selected reference word ($\phi$, 7) and (7, $\phi$) and the former and the latter reference pattern segments of the second selected reference word ($\phi$, 4) and (4, $\phi$) at first into a segment concatenation 38 or B given as:

$$B = b_1, b_2, \ldots, b_j, \ldots, b_J,$$

where $b_j$ represents a j-th concatenation feature vector and J, a concatenation duration which is equal to a sum of the input pattern durations of the individual input speech patters representative of the first and the second selected reference words or numerals "7" and "4." It is possible to understand that the feature vectors of the continuous known input speech pattern A' and the segment concatenation B are equally spaced along a pair of time axes i and j, respectively.

Subsequently, the time axes i and j are mapped or warped to each other. For example, a minimization problem is solved by resorting to dynamic programming as described in Sakoe U.S. Pat. No. 4,049,913 as regards a maximization problem for a partial pattern A(p, m) and a reference pattern B. The problem is:

$$\min_{i=i(j)} \left[ \sum_{j=1}^{J} d(i, j) \right],$$

where d(i, j) represents a distance between the i-th input pattern feature vector $a_i$ and the j-th concatenation feature vector $b_j$. On solving the problem, sums of such distances are calculated with an i(j)-th input pattern feature vector $a_{i(j)}$ selected for each j-th concatenation feature vector $b_j$ in compliance with each of various relationships i=i(j). The minimum defines a mapping or warping function:

$$i = i(j). \tag{2}$$

By the mapping function (2), a correspondence is established between a point of concatenation of the reference patterns ($\phi$, 7) and (7, $\phi$) in the reference pattern concatenation 38 and the intra-word characteristic point of the numeral "7" in the continuous known input speech pattern 36. Likewise, another correspondence is found between a similar point of concatenation of the reference patterns ($\phi$, 4) and (4, $\phi$) and the intra-word characteristic point of the word "4," into which the word "7" merges at somewhere in the continuous known input speech pattern 36. A pair of instants corresponding to the respective points of concatenation, is a pair of intra-word characteristic points in those parts of the continuous known input speech pattern 36 which are representative of the first and the second selected reference words, respectively. The intra-word characteristic point pair is thus found with reference to the segment concatenation 38. The segmenting unit 26 now segments the word pair reference pattern segment 37 from the continuous known input speech pattern 36 at the intra-word characteristic point pair. The word pair reference pattern segment 37 is stored in the reference pattern memory 24 as a reference pattern (7, 4).

As indicated in FIG. 2 at 2-9, the operation is repeated for the two-digit numerals "00" through "99." When the word pair reference pattern segments (0, 0) through (9, 9) are stored in the reference pattern memory 24, the registration mode of operation comes to an end as indicated at 2-10.

The reference patterns stored in the reference pattern memory 24 in response to the respective word pair reference pattern segments, may be named demi-word pair reference patterns, respectively. This is because the former and the latter parts of each of such reference patterns are representative of a latter demi-word of the first selected reference word and a former demi-word of the second selected reference word, respectively. It is also possible to refer to the reference patterns given by the former and the latter reference pattern segments, respectively, also as demi-word pair reference patterns. This is because the former and the latter parts of each of the latter demi-word pair reference pattern pairs are merely latter and former demi-words of the null reference words, respectively, Let each numeral be pronounced only in a predetermined manner. For example, the numeral "0" may always be pronounced "zero" should not be pronounced otherwise, such as "oh." Under the circumstances, the number of demi-word pair reference patterns to be stored in the reference pattern memory 24 is one hundred and twenty.

It is known in the art that the reference pattern memory 24 has addresses at which the respective demi-word pair reference patterns are stored. The control unit 25 produces a reference pattern specifying signal, which successively accesses the addresses. In conventional continuous speech recognition systems, the reference pattern specifying signal is used also in indicating the respective reference words. For a system according to this invention, it is to be noted that such a reference pattern specifying signal should indicate, at a time, a predetermined one of the latter and the former demi-words represented by the demi-word pair reference pattern stored at the address accessed by the reference pattern specifying signal under consideration.

The recognition system illustrated in FIG. 1 is now operable in the recognition mode. A multi-digit numeral is spoken to the microphone 21, which produces an unknown input voice pattern A" given in the form of Equation (1). At least a portion of the input pattern feature vector sequence is held in the pattern buffer 23 and delivered thence to a recognizing unit 41. The demi-word pair reference patterns ($\phi$, 0) and (0, $\phi$) through ($\phi$, 9) and (9, $\phi$) and (0, 0) through (9, 9) are also fed to the recognizing unit 41. The mode switching signal h puts the recognizing unit 41 into operation.

The recognizing unit 41 may be that part of the continuous speech recognition system disclosed in the above-referrenced Sakoe U.S. Pat. No. 4,326,101 with reference to FIG. 5 thereof, which comprises the first matching unit 19, the state transition table 21, the second matching unit 22, the recurrence value table 23, the optimum parameter table 24, and the decision unit 29. The elements of the part being referred to, may be those illustrated in U.S. Pat. No. 4,326,101 with reference to FIGS. 8, 10, and 11. The state transition table 21 will later be described. The recognition unit 41 is operable as described in the cited U.S. Pat. No. 4,326,101 with reference to FIGS. 6 and 9, except that the reference patterns are now the demi-word pair reference patterns. Preliminary segmentation of the unknown input voice pattern A" is unnecessary as in the Sakoe U.S. Pat. No. 4,049,913. It is to be noted here that contradiction must not occur in each concatenation of the demi-word pair reference patterns. To be more specific, one of the demi-word pair reference patterns (4, x) might be concatenated to another pattern (y, 3), where each of x and y represents one of $\phi$ and "0" through "9," if the demi-word pair reference patterns were carelessly concatenated. Such a careless concatenation is meaningless in carrying out the pattern matching. If a part of the unknown input voice pattern A" were matched to such a concatenation, the part is recognized as "4" and "3" when the reference word specifying signal indicates the latter and the former demi-words, respectively.

Figure 5:
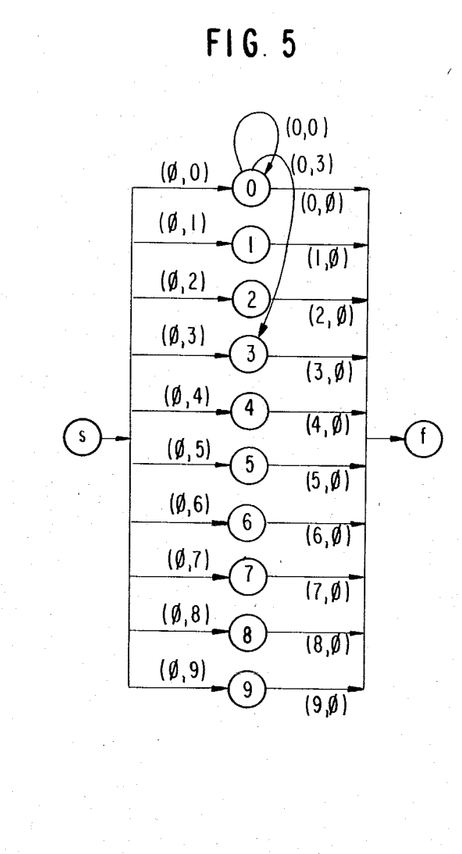
FIG. 5 shows a state transition diagram of a finite-state automaton used in the system illustrated in FIG. 1.

Referring to FIG. 5, a finite-state automaton has an initial state s, a final state f, and zeroth through ninth intermediate states in a state transition diagram. The intermediate states are in one-to-one correspondence to the preselected reference words, namely, the one-digit numerals "0" through "9," and will be denoted by 0 through 9, respectively. State transition takes place from the initial state s to an n-th intermediate state n, where n represents one of "0" through "9," when the recognizing unit 41 is supplied with a latter reference pattern segment ($\phi$, n) as labelled along paths of transition from the initial state s to the intermediate states 0 through 9. When the automaton is in the n-th intermediate state n, transition is possible therefrom either to one of the intermediate states 0 through 9 or to the final state f only when the recognizing unit 41 is supplied with a demi-word pair reference pattern (n, x). For example, transition takes place from the n-th intermediate state n to an m-th intermediate state m in response to a word pair reference pattern segment (n, m), where m represents one of "0" through "9." The transition may result in a loop path when m=n, namely, when the recognizing unit 41 is supplied with a demi-word pair reference pattern (n, n).

Figure 6:
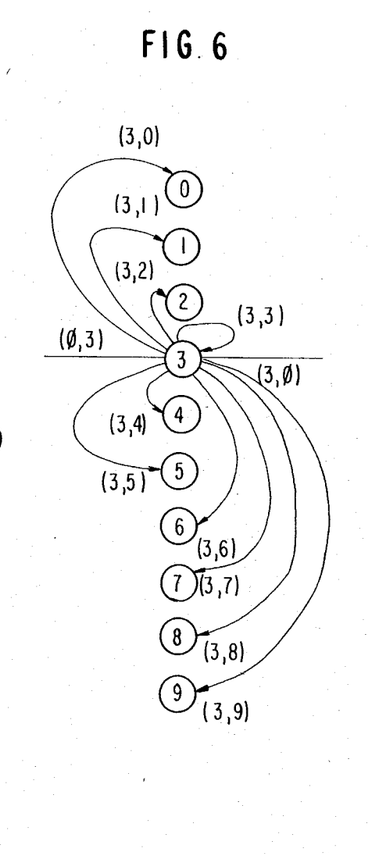
FIG. 6 is a detailed illustration of a part of the diagram depicted in FIG. 5.

Turning to FIG. 6, transition from the third intermediate state 3 to any one of the ten intermediate states 0 through 9, is depicted. The word pair reference pattern segments which give rise to such transitions, are labelled along the respective paths. Similar transition is possible at the other intermediate states 0 to 2 and 4 to 9.

When the recognition is controlled by such a finite-state automaton, all concatenations of the demi-word pair reference patterns are free from contradition. For instance, the demi-word pair reference pattern (3, x) is indispensable on departing from the third intermediate state 3, into which transition has next previously took place in response to the demi-word pair reference pattern (y, 3). In other words, the demi-word pair reference pattern (y, 3) is necessarily followed by the demi-word pair reference pattern (3, x) with no contradiction. Summarizing, state transition is possible from the initial state s eventually to the final state f, passing through the intermediate state or states a certain number of times, only when a concatenation of the demi-word pair reference patterns is of the type:

$$(\phi, a)(a, b)(b, c) \ldots (p, q)(q, \phi),$$

where each of a through c and p and q represents one of "0" through "9." When the concatenation that is most similar to an unknown input voice pattern A" is a concatenation ($\phi$, 3)(3, 9)(9, 4)(4, $\phi$), the reference word specifying signal indicates that the voice pattern A" is representative of a three-digit numeral 394.

The coarticulation effect is already taken into consideration in each word pair reference pattern segment. When concatenated, the demi-word pair reference patterns would therefore results in a recognition result OUT (FIG. 1) which is free from the problem of coarticulation. The recognition result OUT is produced using the dynamic programming as described in Sakoe U.S. Pat. No. 4,326,101 in connection with the recurrence formula.

The above-referenced Sakoe U.S. Pat. No. 4,049,913 teaches that a succession of continuously spoken words is more accurately recognized when the number of words is subjected to a limitation. In accordance with the teaching, the number of words may be limited either to an odd or an even positive integer or to an integar included in a set of positive integers.

Figure 7:
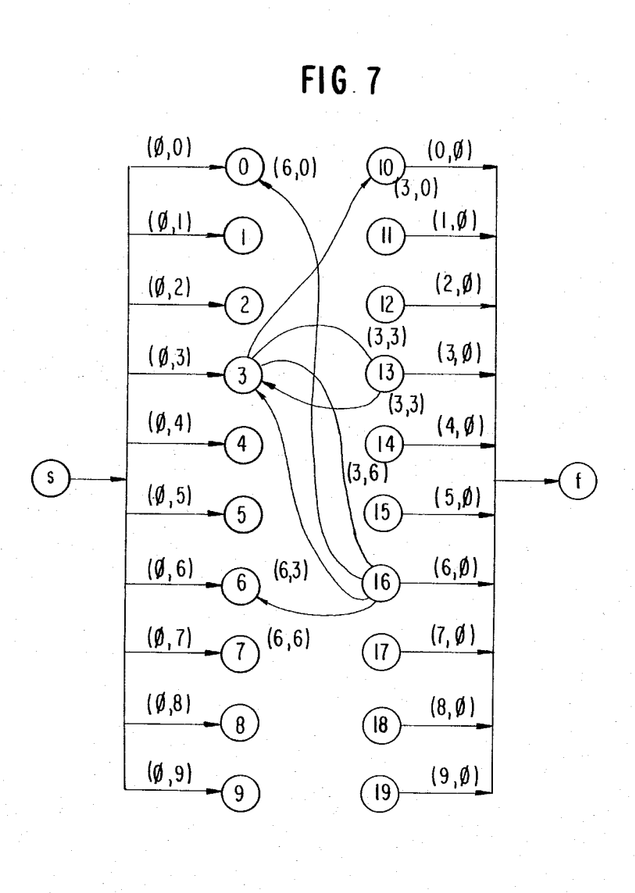
FIG. 7 is another state transition diagram for the finite-state automaton.
Figure 8:
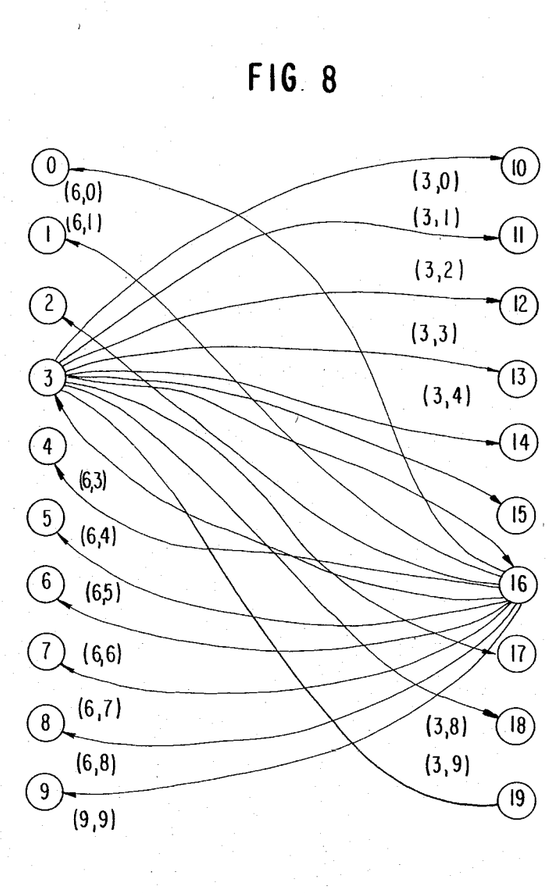
FIG. 8 partly shows in detail the diagram illustrated in FIG. 7.

Referring to FIGS. 7 and 8, another state transition diagram is for a finite-state automaton for restricting the number of demi-word pair reference patterns in each concatenation to an odd integer. The automaton has an initial state s, a final state f, zeroth through ninth former states 0 to 9, and zeroth through ninth latter states 10 to 19. As is the case with the former states 0 through 9, the latter states 10 through 19, although so denoted, are in one-to-one correspondence to the one-digit numerals "0" through "9." State transition if possible forwardly from each of the former states 0 through 9 to any one of the latter states 10 through 19 and backwardly from each of the latter states 10 through 19 to any one of the former states 0 through 9. Inasmuch as a word pair reference pattern segment (n, n) gives rise to transition either from the n-th former state n forwardly to the n-th latter state 1n or backwardly therebetween, the loop path in no more necessary.

Together with the former and the latter reference pattern segments, FIG. 7 depicts all possible state transitions from the initial state s to the former states 0 through 9 and from the latter states 10 through 19 to the final state f. Likewise, FIG. 8 shows all possible transitions from the third former state 3 forwardly to the latter states 10 through 19 and backwardly from the sixth latter state 16 to the former states 0 through 9. Transition from the initial state s eventually to the final state f is possible only when the former and the latter states are passed through an even number of times.

As a consequence, the number of demi-word pair reference patterns in each concatenation is limited to an even number. The optimum concatenation may therefore be ($\phi$, 3)(3, 4)(4, 2)(2, $\phi$), when the unknown input voice pattern being produced by the microphone 21 is recognized as a three-digit numeral 342. The former and the latter states may be referred to either as the intermediate states of a first and a second group, respectively, or in a like manner.

If the number of continuously spoken words should be restricted to an even number, the transition paths should be formed between the initial state s and the latter states 10 through 19 rather than between the initial state s and the former states 0 through 9. Alternatively, the transition paths should lie between the former states 0 through 9 and the final state f. The alternative is equivalent to the state transition diagram in which the transition paths are changed for the initial state s from the former states 0 to 9 to the latter states 10 to 19.

Figure 9:
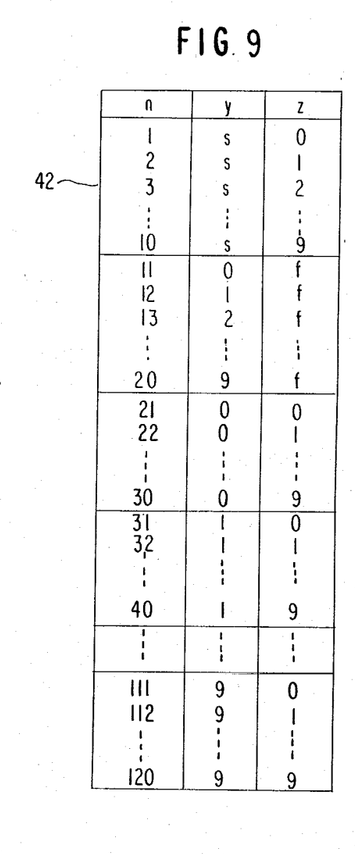
FIG. 9, diagrammatically shows memory sections and memory locations of a state transition table for use in the finite-state automaton.

Finally referring to FIG. 9, a state transition table 42 should be substituted in the recognizing unit 41 for that described in the above-referenced Sakoe U.S. Pat. No. 4,326,101 with reference to FIG. 7 thereof. The state transition table 42 is depicted with the reference letters n, y, and z used as in the referenced patent application. Operation of the table 42 in the recognizing unit 41 will readily be understood when the Sakoe patent application is referred to.

While a continuous speech recognition system according to a preferred embodiment of this invention has thus far been described with reference to the accompanying drawing, it will now be easy for one skilled in the art to carry this invention into effect in various other manners. For example, any known similarity measure may be used instead of the distance d(i, j). In a continuous speech recognition system according to another preferred embodiment of this invention, the segmenting unit 26 is removed. Instead, the pattern buffer 23, the reference pattern memory 24, the control unit, and, if desired, the displaying unit 27 should be connected to an external segmenting device, such as a processor common to similar continuous speech recognition systems. The continuous speech recognition system according to this invention is equally well applicable to recognition of a continuously spoken general word succession. It is now understood that a continuous speech recognition system according to this invention comprises means, such as 23, 24, and 25, for memorizing a plurality of discrete dimi-word pair reference patterns, such as ($\phi$, 0) through ($\phi$, 9), (0, $\phi$) through (9, $\phi$), and (0, 0) through (9, 9), and means, such as 25 and 41, connected to the reference pattern memorizing means to be operable as a finite-state automaton to recognize the succession by using a pattern concatenation of optimum demi-word pair reference patterns which are selected from the discrete demi-word pair reference patterns and concatenated at least at an interface, with the concatenation controlled by the automaton so that no contradiction appears at every interface. In practice, the reference pattern memorizing means comprises means for operatively connecting the constituents thereof to a segmenting device, such as the segmenting unit 26. It is also possible to render the automaton further operable as described in the referenced Sakoe U.S. Pat. No. 4,326,101.

What is claimed is:

1. A continuous speech recognition system for recognizing a succession of continuously spoken words with reference to a plurality of preselected reference words, each reference word having an intra-word characteristic point approximately at a point of bisection of said reference word, said system comprising:

means for memorizing a plurality of discrete demi-word pair reference patterns, each reference pattern being given by a sequence of parameters characteristic of a demi-word pair which lies between the intra-word characteristic point of a preceding reference word and the intra-word characteristic point of a succeeding reference word, said preceding and said succeeding reference words being continuously pronounced; and means connected to said reference pattern memorizing means to be operable as a finite-state automaton to recognize said succession by using a pattern concatenation of optimum demi-word pair reference patterns which are selected from said discrete demi-word pair reference patterns and concatenated at least at an interface, said automaton being for controlling said concatenation so that no contradiction occurs at every interface.

2. A continuous speech recognition system as claimed in claim 1, wherein said reference pattern memorizing means comprises:

means for holding, at one time, parameters characteristic of at least those two of said preselected reference words which are continuously pronounced;

a reference pattern memory; and means for operatively connecting said parameter holding means and said reference pattern memory to segmenting means operable at first to segment, with each of said preselected reference wors selected, a former and a latter reference pattern segment from a parameter sequence representative of the selected reference word at the intra-word characteristic point thereof and to store said former and said latter reference pattern segments in said reference pattern memory as those two of said discrete demi-word pair reference patterns in which the preceding and the succeeding reference words are null reference words, respectively, and thereafter operable to form, for each pair of those first and second selected ones of said preselected reference words which are successively continuously pronounced, a segment concatenation of the former and the latter reference pattern segments for the first selected reference word and the former and the latter reference pattern segments for the second selected reference word, to find a pair of intra-word characteristic points in a parameter sequence representative of the first and the second selected and successively continuously pronounced reference words with reference to said segment concatenation, to segment a word pair reference pattern segment from the last-mentioned parameter sequence at said intra-word characteristic point pair, and to store said word pair reference pattern segment in said reference pattern memory as one of said discrete demi-word pair reference patterns.

3. A continuous speech recognition system as claimed in claim 2, wherein the intra-word characteristic point is an instant which substantially bisects a duration of a parameter sequence representative of each of said preselected reference words.

4. A continuous speech recognition system as claimed in claim 2, wherein the intra-word characteristic point is an instant at which spectra of utterance of each of said preselected reference words have a maximum variation adjacently of an instant which bisects a duration of a parameter sequence representative of said each reference word.

5. A continuous speech recognition system as claimed in claim 2, wherein the intra-word characteristic point is an instant at which spectra of utterance of each of said preselected reference words have a minimum variation adjacently of an instant which bisects a duration of a parameter sequence representative of said each reference word.

6. A continuous speech recognition system as claimed in any one of claims 2 through 5, wherein said automaton has an initial state, a final state, and a plurality of intermediate states for the respective ones of said preselected reference words, the former reference pattern segment for a first of said preselected reference words giving rise to state transition from said initial state to one of said intermediate states that is for said first reference word, the latter reference pattern segment for a second of said preselected reference words giving rise to state transition to said final state from one of said intermediate states that is for said second reference word, the word pair reference pattern segment for said first and said second reference words giving rise to state transition from a former one of said intermediate states to a latter one of said intermediate states, said former and said latter intermediate states being for said first and said second reference words, respectively.

7. A continuous speech recognition system as claimed in any one of claim 2 through 5, wherein said automaton has an initial state, a final state, a first group of intermediate states, and a second group of intermediate states, the intermediate states of each group being for the respective ones of said preselected reference words, the former reference pattern segment for a first of said preselected reference words giving rise to state transition from said initial state to one of the intermediate states of said first group that is for said first reference word, the latter reference pattern segment for a second of said preselected reference words giving rise to state transition to said final state from that one of the intermediate states of a predetermined one of said first and said second groups which is for said second reference word, the word pair reference pattern segment for said first and said second reference words giving rise to state transition from a former one of the intermediate states of one of said first and said second groups to a latter one of the intermediate states of the other of said first and said second groups, said former and said latter intermediate states being for said first and said second reference words, respectively.

* * * * *

UNITED STATES PATENT AND TRADEMARK OFFICE
CERTIFICATE OF CORRECTION

PATENT NO. : 4,513,435

DATED : April 23, 1985

INVENTOR(S) : Sakoe et al

It is certified that error appears in the above-identified patent and that said Letters Patent is hereby corrected as shown below:

On the front page, at "Attorney, Agent, or Firm", delete the name "Rothwell".

IN THE SPECIFICATION:

Column 1, line 22, insert --the-- before "most";

line 31, add --"-- after "Recognition.".

Column 2, line 53, insert --which-- after "pair".

Column 4, line 42, change "pronunciating" to --pronunciation--;

line 46, change "pronounciation" to --pronunciation--.

Column 5, line 26, change "incleded" to --included--.

Column 6, line 14, change "patters" to --patterns--.

Column 7, line 20, insert --and-- after "zero";

line 51, change "above-referrenced" to --above-referenced--.

Column 9, line 22, change "if" to --is--;

line 30, change "in" to --is--.

UNITED STATES PATENT AND TRADEMARK OFFICE
CERTIFICATE OF CORRECTION

PATENT NO.  :  4,513,435

DATED       :  April 23, 1985

INVENTOR(S) :  Sakoe et al

It is certified that error appears in the above-identified patent and that said Letters Patent is hereby corrected as shown below:

IN THE CLAIMS:

Column 11, line 8, change "wors" to --words--.

Column 12, line 27, change "claim" to --claims--.

Signed and Sealed this

Tenth Day of December 1985

[SEAL]

Attest:

DONALD J. QUIGG

Attesting Officer

Commissioner of Patents and Trademarks